(12) United States Patent
Makgeru

(10) Patent No.: US 12,301,079 B2
(45) Date of Patent: May 13, 2025

(54) ELECTRIC GENERATOR HAVING PLURAL STATORS

(71) Applicant: THE TRUSTEES FOR THE TIME BEING OF THE KMN FULFILMENT TRUST, Benoni (ZA)

(72) Inventor: Kabu Walter Makgeru, Benoni (ZA)

(73) Assignee: THE TRUSTEES FOR THE TIME BEING OF THE KMN FULFILMENT TRUST, Benoni (ZA)

( * ) Notice: Subject to any disclaimer, the term of this patent is extended or adjusted under 35 U.S.C. 154(b) by 177 days.

(21) Appl. No.: 17/924,795

(22) PCT Filed: May 7, 2021

(86) PCT No.: PCT/IB2021/053898
§ 371 (c)(1),
(2) Date: Nov. 11, 2022

(87) PCT Pub. No.: WO2021/229391
PCT Pub. Date: Nov. 18, 2021

(65) Prior Publication Data
US 2023/0208262 A1  Jun. 29, 2023

(30) Foreign Application Priority Data
May 13, 2020 (ZA) .................................. 2020/02703

(51) Int. Cl.
*H02K 16/04* (2006.01)
*H02K 1/18* (2006.01)
*H02K 1/22* (2006.01)

(52) U.S. Cl.
CPC .................................... *H02K 16/04* (2013.01)

(58) Field of Classification Search
CPC ............. H02K 16/04; H02K 1/22; H02K 1/18
(Continued)

(56) References Cited

U.S. PATENT DOCUMENTS 5,982,074 A    11/1999  Smith et al.
2007/0138896 A1  6/2007  Zhu
(Continued)

FOREIGN PATENT DOCUMENTS

CA       2541286 A1      9/2006
CN    102195424 A   *   9/2011
(Continued)

OTHER PUBLICATIONS

Chile Office Action for Application No. 202203144, dated Feb. 1, 2024, 8 pages.
(Continued)

*Primary Examiner* — Jose A Gonzalez Quinones
(74) *Attorney, Agent, or Firm* — McCarter & English, LLP

(57) ABSTRACT

An electric power generator comprises a rotor and a plurality of stators arranged coaxially and concentrically about a central axis. A first stator is provided concentrically around and adjacent to the rotor, the rotor and the first stator being separated by a rotor-stator airgap and a second stator is provided concentrically around and adjacent to the first stator, the first and second stators being separated by a stator-stator airgap. The rotor includes a plurality of magnetic pole structures configured to provide or generate a plurality of magnetic poles and a radially outer surface of each of the magnetic pole structures is curved with an average radius of curvature which is less than an average distance between the outer surface and the central axis. The rotor-stator airgap thus varies circumferentially in distance, with a shortest distance being at a circumferential centre of each of the magnetic pole structures and longest distance being at circumferential ends of each of the magnetic pole structures. The stator-stator airgap is of uniform thickness.

14 Claims, 4 Drawing Sheets

(58) Field of Classification Search
USPC .................... 310/156.35, 114, 49.51, 156.01
See application file for complete search history.

(56) References Cited

U.S. PATENT DOCUMENTS

| | | |
|---|---|---|
| 2012/0139379 A1 | 6/2012 | Ge et al. |
| 2013/0093276 A1 | 4/2013 | Kim |
| 2014/0002001 A1 | 1/2014 | Kinashi |
| 2014/0028137 A1 | 1/2014 | Kobayashi |
| 2014/0232233 A1 | 8/2014 | Fukushima et al. |
| 2018/0301955 A1 | 10/2018 | Estival et al. |

FOREIGN PATENT DOCUMENTS

| | | | |
|---|---|---|---|
| CN | 104734440 A | 6/2015 | |
| DE | 102012217363 B4 | 1/2020 | |
| EP | 1524755 B1 | 6/2007 | |
| EP | 2479871 A1 | 7/2012 | |
| EP | 2880749 B1 | 11/2016 | |
| JP | 2003-264952 A | 9/2003 | |
| JP | 2006-271056 A | 10/2006 | |
| JP | 2007-336724 A | 12/2007 | |
| WO | 2008/058688 A2 | 5/2008 | |
| WO | 2011/036723 A1 | 3/2011 | |
| WO | 2014/020514 A1 | 2/2014 | |
| WO | WO-2020228297 A1 * | 11/2020 | ............. H02K 1/274 |
| WO | 2020/261113 A1 | 12/2020 | |

OTHER PUBLICATIONS

European Office Action for Application No. 21804382.6, dated Sep. 27, 2023, 10 pages.
Israel Office Action for Application No. 4925110, dated May 26, 2024, 10 pages.
Japanese Office Action for Application No. 2022-569104, dated Jan. 9, 2024, 6 pages.
Korean Office Action for Application No. 10-2022-7041159, dated Jun. 24, 2024, 12 pages.

* cited by examiner

ELECTRIC GENERATOR HAVING PLURAL STATORS

CROSS-REFERENCE TO RELATED APPLICATIONS

This application is a 35 U.S.C. § 371 national stage filing of International Application No. PCT/IB2021/053898 filed on May 7, 2021, which in turn claims priority to South Africa Patent Application No. 2020/02703, filed May 13, 2020. The entire contents of each of the foregoing applications are included herein by reference in their entirety.

FIELD OF INVENTION

This invention relates generally to electric power generators and more specifically to an electric power generator having one rotor and plural stators.

BACKGROUND OF INVENTION

The Applicant notes that the basic design of electric power generators has not changed for many years. Most electric power generators have a rotor and stator, where stator envelops the rotor, or other rotary combinations of these two parts, to generate electricity.

In most cases, a stator is accompanied by a rotor and the stator has a return path (sometimes referred to as a back-iron) to guide the magnetic field to complete a magnetic circuit and to fully use the magnetic field as it moves from one pole to another. The teaching in the art is to have a return path axially outwardly of the stator (in radial airgap machines). There has been research and many innovation and invention attempts to optimise and improve the efficiency of electric power generator. Most of these attempts are guided by the prevailing teaching of the art, which teaches that the rotor generates a magnetic field which radiates from the rotor into and through the stator and returns through the return path and forming a closed circuit of the magnetic field and therefore completing the magnetic field loop.

This teaching does work and has been used effectively for many years. US2007/0138896 discloses an electrical machine, specifically is a reluctance motor, which has two rotors and two stators; it has an airgap whose function is to isolate the two stators from each other, so that there is no, or minimal, magnetic linkage between these two stators. This motor has also a bias magnet device that encourages a unidirectional magnetic flux towards the rotor, so that the motor rotor may have a higher torque. The airgap and the permanent magnet work together to give the magnetic field one direction, and also to make sure that the magnetic field of the stators does not link together.

Another prior art document is CA2541286. This document discloses two stators which are axially spaced apart.

The Applicant notes that there have been attempts, as the abovementioned patents and prior art effectively illustrate, and that there has always been a long-felt need to improve the configuration of electric power generators and to improve the performance of such generators. A main weakness in prior art attempts is that they do not fully realise or utilise large potential that lies in the magnetic field.

The Applicant desires an electric power generator which has plural stators and uses radial characteristics of the magnetic field to generator an improved power output at an affordable cost which brings commercial benefits.

SUMMARY OF INVENTION

Accordingly, the invention provides an electric power generator comprising a rotor and a plurality of stators, wherein:
  the rotor and the plurality of stators are arranged coaxially and concentrically about a central axis;
  the rotor is provided radially inwardly of the plurality of stators;
  a first stator of the plurality of stators is provided concentrically around and adjacent to the rotor, the rotor and the first stator being separated by a rotor-stator airgap;
  a second stator of the plurality of stators is provided concentrically around and adjacent to the first stator, the first and second stators being separated only by a stator-stator airgap;
  the rotor includes a plurality of magnetic pole structures configured to provide or generate a plurality of magnetic poles;
  a radially outer surface of each of the magnetic pole structures is curved with an average radius of curvature which is less than an average distance between the outer surface and the central axis, the rotor-stator airgap thus varying circumferentially in distance, with a shortest distance being at a circumferential centre of each of the magnetic pole structures and longest distance being at circumferential ends of each of the magnetic pole structures; and
  the stator-stator airgap is of uniform thickness.

In the rotor-stator airgap, a ratio of the longest distance to the shortest distance may be in the range of 30:1 to 2:1, more specifically 20:1 to 5:1, more specifically 15:1 to 10:1, and more specifically 14:1 to 13:1. Although actual dimensions may be dictated by an overall size of the electric power generator, the longest distance may be around 135 mm and the shortest distance may be at least 5 mm.

The shortest distance at a circumferential centre of each of the magnetic pole structures may be 5 mm-50 mm. The longest distance at circumferential ends of each of the magnetic pole structures may be 30 mm-150 mm.

The stator-stator airgap may be shorter than the shortest distance of the rotor-stator airgap. The stator-stator airgap may be at least 0.25 mm and more particularly may be at least 2 mm.

The electric power generator may include a back-iron. The back-iron may provide a return path and assist in closing a magnetic circuit from the magnetic poles of the rotor. The back-iron may be provided around the plurality of stators, in other words, around an outermost stator. Stator(s) that are located between the rotor and the outermost stator is/are the intermediate stator(s); in a two-stator generator, there will only be one intermediate stator (the first stator), in a three-stator generator, there will be two intermediate stators, and so forth.

The plural stators may serve one or more of the following purposes:
  Utilise a magnetic field generated by the rotor more completely than a single stator generator would.
  Produce a better waveform from windings in the plural stators compared with windings in only a single stator. In the context of this specification, "better waveform" may mean more sinusoidal, lower harmonics, and/or smoother than that produced by a single stator.
  The windings in the plural stators may be connected to each other in parallel.

The electric power generator may include only two stators. The electric power generator may include three stators, or more than three stators.

The electric power generator may produce, as a result of presence and configuration of the plural stators, a sinusoidal output waveform having a Total Harmonic Distortion of less than 0.8% without use of waveform-correcting circuitry, which may be a superior and surprising technical outcome.

The invention may provide a new way to fully utilise the magnetic field that radiates from the rotor efficiently. In prior art designs, the magnetic field from the rotor radiates outwards into the stator and then into the return path. The return path directs the magnetic field back into the next pole of the rotor. This prior art configuration may seem fine and it does not look like there is a need for another stator because of the culture and the teaching of the art which has been taught for at least a century. The inclusion of two or more stators as per the proposed invention may, at first glance, seem rather strange to add a second (or third, etc.) adjacent to the first one, without addition of more rotors. These prior art patent designs may not capture fully the potential in the magnetic field properties.

The other valuable property of the magnetic field which is highly beneficial is that when two magnets of opposite polarities, e.g., north pole facing south pole as it happens with the stators at the smaller airgaps, the magnetic field strength of both sides increases and in some may even double in size. This effect bring a bigger rate of change and therefore a high level of voltage generation.

The invention may more fully capture the potential in the magnetic field by including more adjacent stators; these stators may overlay each other concentrically and they are all concentric to the rotor. The rotor may rotate inside the stators and radiate the magnetic field through the adjacent stator and then into the next stator(s).

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

The following description of an example embodiment of the invention is provided as an enabling teaching of the invention. Those skilled in the relevant art will recognise that changes can be made to the example embodiment described, while still attaining the beneficial results of the present invention. It will also be apparent that some of the desired benefits of the present invention can be attained by selecting some of the features of the example embodiment without utilising other features. Accordingly, those skilled in the art will recognise that modifications and adaptations to the example embodiment are possible and can even be desirable in certain circumstances and are a part of the present invention. Thus, the following description of the example embodiment is provided as illustrative of the principles of the present invention and not a limitation thereof.

Figure 1:
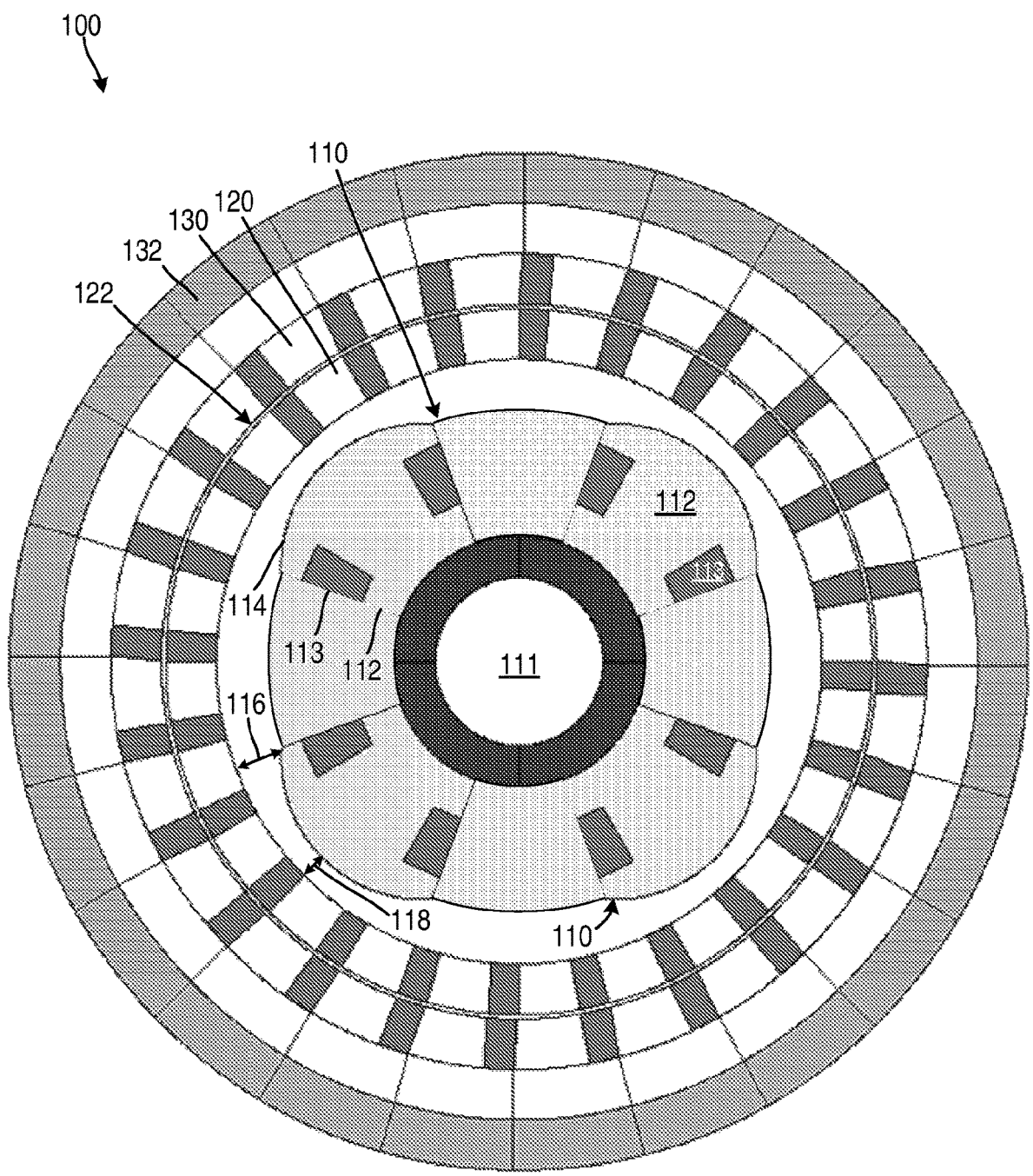
FIG. 1 shows a schematic cross-sectional view of a first embodiment of an electric power generator, in accordance with the invention.

FIG. 1 shows a first embodiment of an electric power generator 100, in accordance with the invention. Only the germane parts of the generator 100 are illustrated and more common parts (like bearings, an axle, a frame, input drive, output wiring, etc.) are not illustrated but will be understood by one skilled in the art that they may form part of the invention.

The generator 100 has a central rotor 110 mounted to rotate about a central axis 111. The rotor 110 has a plurality of magnetic pole structures 112 configured to provide or generate a plurality of magnetic poles (e.g., N-S-N-S). Each magnetic pole structure 112 has a magnet element 113 which could be a permanent magnet or an electromagnet. In this example, there are four magnetic pole structures 112 and the generator 100 is thus a four-pole machine. Each magnetic pole structure 112 may be in the form of a rotor shoe.

Each magnetic pole structure 112 has an arcuate radially outer surface 114. A radius of curvature of the outer surface 114 is smaller than a distance from the outer surface 114 to the central axis 111. This means that the outer surface 114 has a more aggressive curvature than a displacement arc which the outer surface 114 describes, in use.

The generator 100 has a plurality of stators 120, 130. In this example embodiment, it has two stators 120, 130, namely an inner stator 120 and an outer stator 130. The inner stator 120 is radially outwardly of, and adjacent to, the rotor 110 and the inner stator 120 and rotor 110 are separated by a rotor-stator airgap 116, 118. The outer stator 130 is radially outwardly of, and adjacent to, the inner stator 120 and the stators 120, 130 are separated only by a stator-stator airgap 122. The stators 120, 130 are arranged coaxially and concentrically about the central axis 111 and the rotor 110; the rotor 110 is arranged radially inwardly of, or inside, the stators 120, 130.

Given the arcuate nature of the outer surface 114 of the magnetic pole structure 112, the rotor-stator airgap 116, 118 is not uniform across a whole length of the outer surface 114. More specifically, the rotor-stator airgap 116, 118 varies circumferentially in distance to the inner stator 120, with a shortest distance 118 being at a circumferential centre of the magnetic pole structure 112 and a longest distance 116 being at circumferential ends of the magnetic pole structure 112.

In contrast, the stator-stator airgap 122 is of uniform thickness. Further, the stator-stator airgap 122 is shorter than even the shortest distance 118 of the rotor-stator airgap 116, 118 and significantly shorter than the longest distance 116 of the rotor-stator airgap 116, 118.

The generator 100 has a back-iron 132 around the second stator 130 to provide a magnetic return path for the magnetic field generated by respective magnetic pole structures 112.

Figure 2:
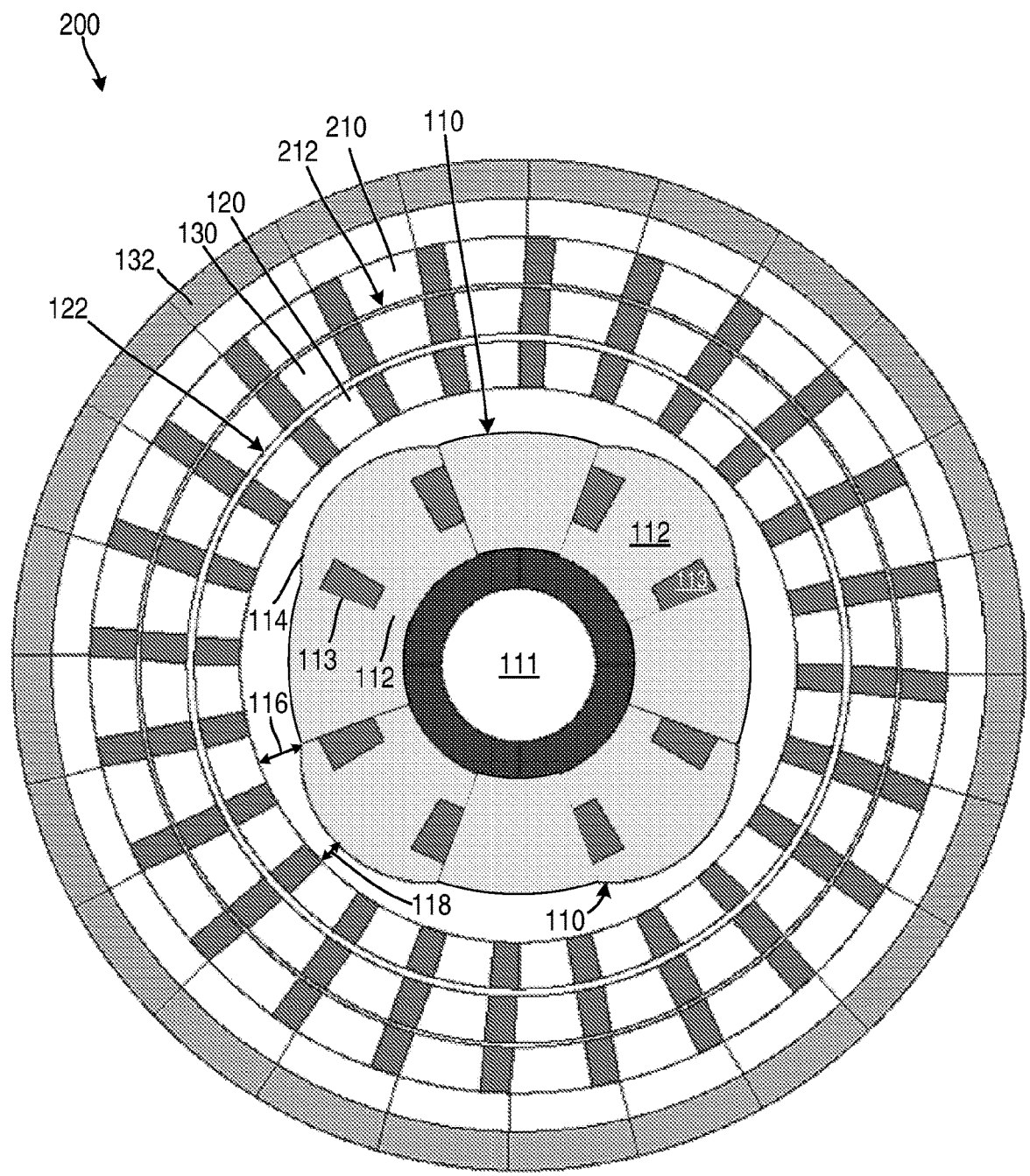
FIG. 2 shows a schematic cross-sectional view of a second embodiment of an electric power generator, in accordance with the invention.

FIG. 2 illustrates a second embodiment of a generator 200 which includes three stators 120, 130, 210. The major difference between this generator 200 and the first generator 100 is the inclusion of a third stator 210 radially outwardly of, and adjacent to, the second stator 130. The second and third stators 130, 210 are separated by a second stator-stator airgap 212 which may be shorter than, or the same as, the (first) stator-stator airgap 122 between the first and second stators 120, 130.

The generator 200 still has the back-iron 132 but it is around the third stator 210.

In tests and simulations, the Applicant has found that the addition of the second stator 130 (and optionally further stators) has two main advantages:

The stators 120, 130, 210 generate more power from the same rotor 110; and A waveform of the generated power has lower harmonics, that is, it is closer to a pure sine wave, than that generated by a single stator. This is to say that each single stator 120, 130, 210 may generate a low harmonic voltage output.

Regarding the first advantage, the Applicant speculates that more stators 120, 130, 210 "consume" or harness more of the available magnetic field generated by the rotor 110. In simulations, the second stator 130 generated about 80% more power than that generated by the first stator 120, which was significant. However, this comes at the cost of increased machine complexity.

The Applicant speculates that 2-3 stators may be the sweet spot, that is, 2-3 stators may provide an optimum payoff between power generation and machine complexity/cost. While more stators (4 or more) would still generate some additional power, the law of diminishing return might not make so many stators viable. More specifically, the first stator 120 generates the electric power (at least, at lower voltages, below 700 V), the second stator 130 generates more power than the first stator 120, and the third stator 210 (in the case of the generator 200) more power that the second stator 130 but the rate of increase of power generation from the second stator 130 to the third stator 210 is small (e.g., less than the increase from the first stator to the second stator), but enough that may still be meaningful and improves the generator performance and its economics. Further, the Applicant has noted that a power factor of the generator 100, 200 (or one with more stators) does decrease the more stators are added, but this can be corrected to an improved or an acceptable level.

Another advantage of the generator 100 is that rotary losses and magnetic field generation losses associated with the rotor 110 are only experienced once, as there is only one rotor 110, in contrast with a multi-rotor, multi-stator machine, which may experience rotor-associated losses additively. A further advantage is that there is one rotor 110 for multiple stators 12, 130, 210 and the electric power generated is a few multiples bigger the power generated by a single stator.

In some embodiments, the rotor-stator airgap 116, 118 may be at least 5 mm in the midpoint (in other words, at the shortest distance 118) of the magnetic pole structure 112 increases uniformly to 35 mm at the two ends of the magnetic pole structure 112 (at the longest distance 116).

The stators 120, 130, 210 are cylindrical shape with a uniform circumferential shape on their inner and outer surfaces all round. As the stators 120, 130, 210 are overlaid concentrically over one another and separated by respective stator-stator airgaps 122, 212, the stator-stator airgaps 122, 212 are uniform around the whole circumference and may range from 0 mm to 150 mm. There may be no need to shape the magnetic flux in the stator-stator airgaps 122, 212 to manipulate the output waveform to be sinusoidal because a sinusoidal (or near-sinusoidal) waveform is created automatically by the shape of the rotor 110 and the rotor-stator airgap 116, 118 and is propagated through the stators 120, 130, 210. In some embodiments, the stator-stator airgaps 122, 212 may be at least 0.25 mm, and may be about 2 mm.

It will be apparent to one skilled in the art that the stators 120, 130, 210 include many features common to stators: teeth and slots with windings accommodated in the slots. A current is induced in the windings by the magnetic field generated by the rotor 110. As the magnetic field from the rotor 110 passes through the plural airgaps 116, 118, 122, 212 and stators 120, 130, 210 it may get reduced and become weaker.

Each stator 120, 130, 210 may include a stator body to provide rigidity and which defines the teeth and slots. The stator body may be made of a magnetite material which may comprise magnetite and a binder. The magnetite material may be in the form of finely ground magnetite, bound and hardened with resin. This may permit a degree of the magnetic field generated by the rotor 110 to pass through the inner stator 120 and interact with the other stators 130, 210. This increased magnetic field indicates that as the rotor 110 rotates this increases the rate of change of the magnetic field on the stators 120, 130, 210, even stators that are located as the outermost stator 130, 210 in the generator 100, 200 experiences the effect. When the stator-stator airgap 122, 212 is smaller, that is in the range of less than about 10 mm, the effect may be magnified. This effect happens with adjacent stators 120, 130, 210.

Figure 3:
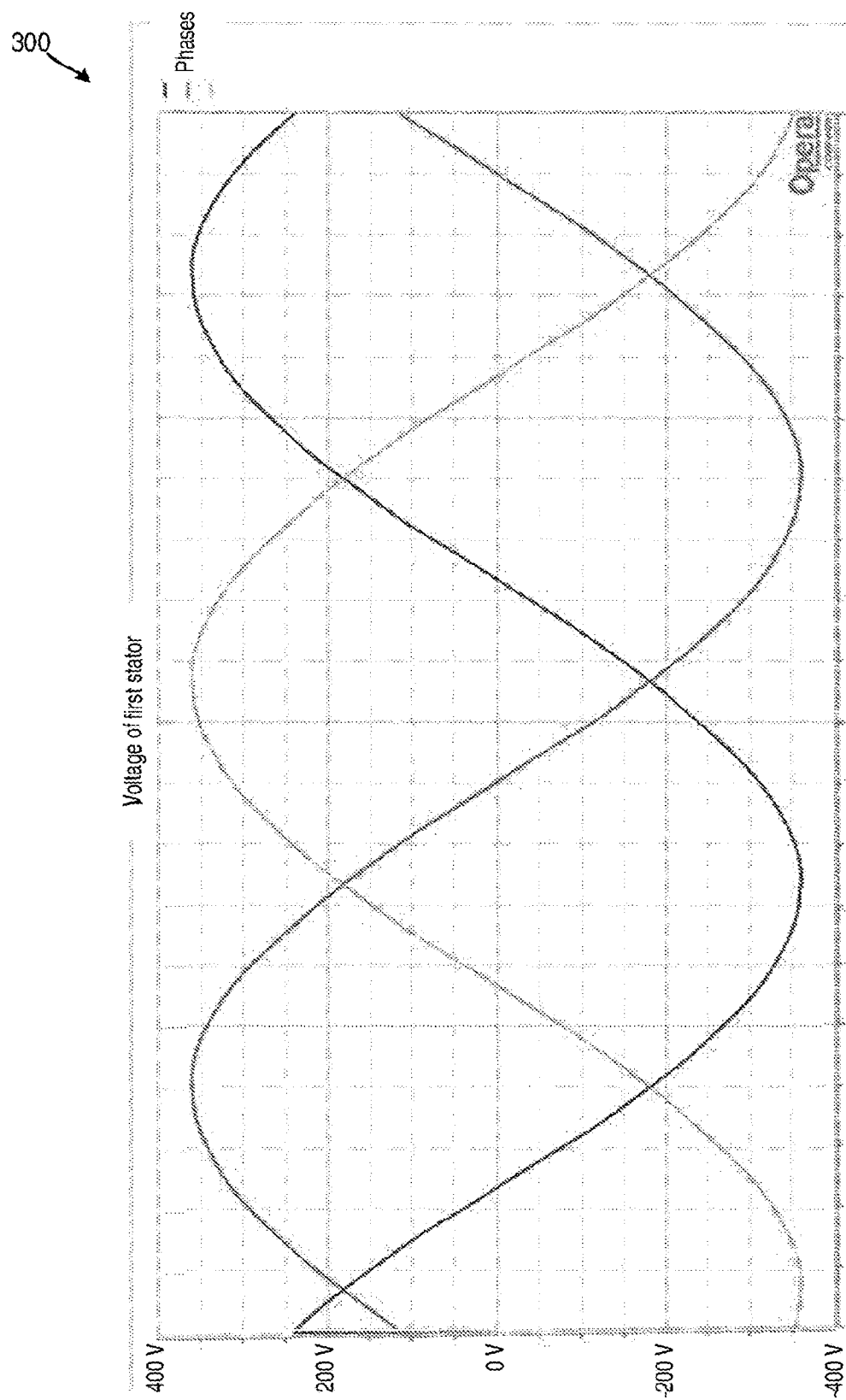
FIG. 3 shows a waveform of a voltage output of a first stator of the generator of FIG. 1.
Figure 4:
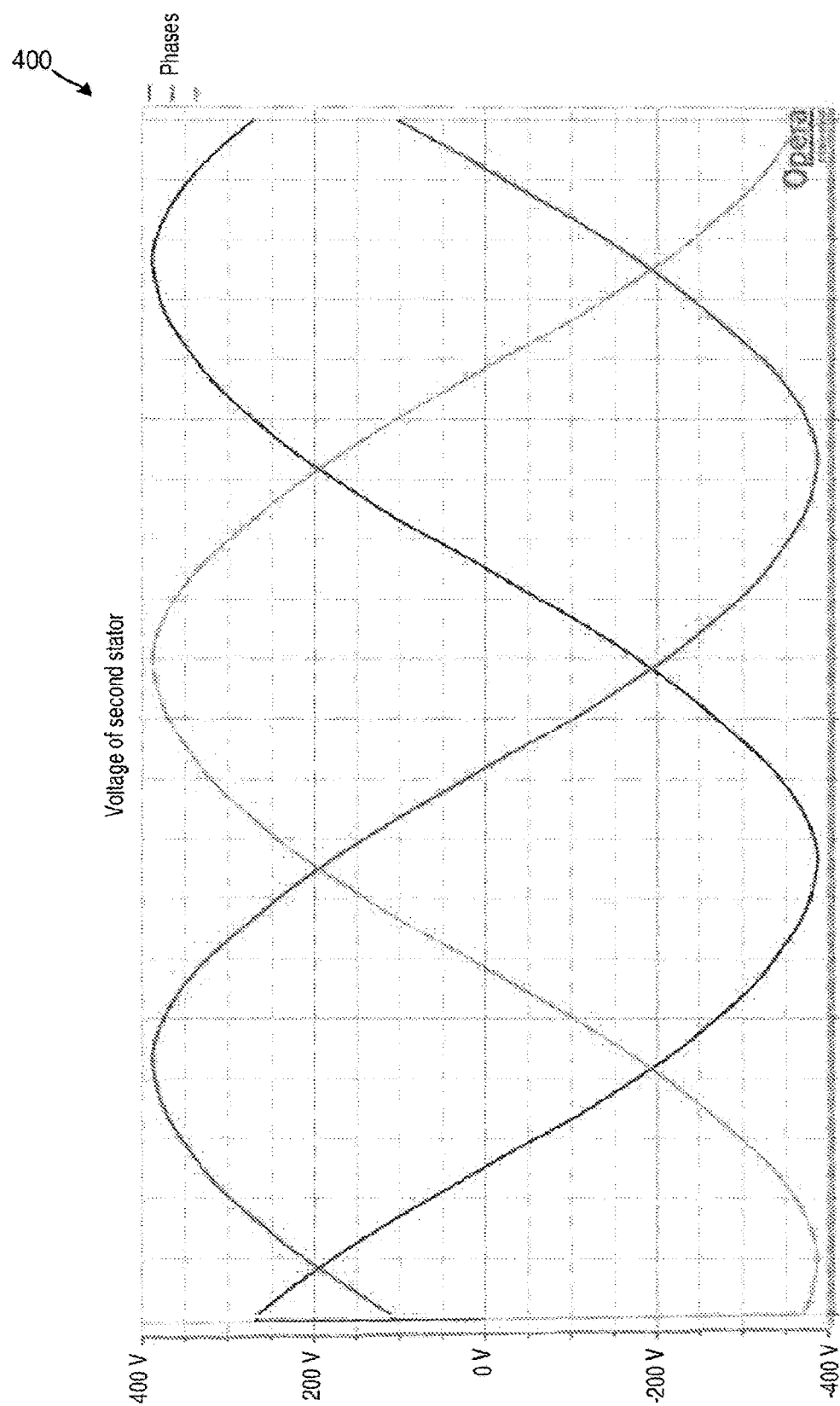
FIG. 4 shows a waveform of a voltage output of a second stator of the generator of FIG. 1.

FIGS. 3-4 shows voltage waveforms 300, 400 induced or generated respectively in the windings of the first and second stators 120, 130. In this configuration, the stator-stator airgap 122 is 5 mm. The generator 100 employs current feeding with an 800 A current and a 60 A field current.

The Applicant speculates that there may be ways and techniques to increase the magnetic field strength or coupling in stators 130, 210 after the inner stator 120. For example, another way to increase the magnetic field from the rotor 110 as it passes through the airgaps 116, 118, 122, 212 and the stators 120, 130, 210 is to have the secondary windings in closed circuit on the stators 120, 130, 210; these secondary windings may be located on upper sections of the stators 120, 130, 210, where they are isolated from the primary power generation windings in the stators 120, 130, 210. These secondary stator windings may not have current input into them. The structural features of these secondary windings is that they may be totally embedded in the stator body and as the rate of change of the magnetic field changes and it links with them they will generate current flow in them and this will generate magnetic field that will be magnified by the electric steel and this magnetic field radiates outwards into the Electric Power Generation windings in the slots of the same stator and outwards into adjacent stator 130, 210 through the stator airgaps 122, 212.

When one or more stators 120, 130 210 are made entirely with magnetite mixed with resin, the magnetite may magnify the magnetic field as well. For the same thickness, magnetite material has a better radial magnetic dispersion than electric steel. These windings may be around the circumference of stator 120, 130 210 all around.

Another embodiment to increase the magnetic field challenge is to have the primary electric power generation winding to be totally embedded in the body of the stator 120, 130 210; this structure could be an electric steel as the base material to make the stator 120, 130 210. The material to make the stator 120, 130, 210 may also be a magnetite material mixed with resin.

In an embodiment of the material to make the stator body being electric steel, embedding the electric power generation winding with a superficial layer of magnetite bound on the surface of the windings to increase the electric field. Finely ground magnetite has a property of higher electric field and using it may increase a working electric field on the stator windings. In this embodiment, the stators 120, 130 210 may not have slots to locate the windings as the windings will be inside the stator 120, 130 210. The secondary windings may be in all the stators; these secondary windings may be in the stators 130 to generate magnetic field radially inwards to the inner adjacent stator 120 and outwards to adjacent outer stator 210 and into the return path 132 of the outermost stator 210.

The primary electric power generation windings that are embedded in the electric steel structure of the stator 120, 130 210 may also radiate the magnetic field radially inwards to the inner adjacent stator 120, 130 and outwards to adjacent outer stator 130, 210 and towards the return path 132. The return path 132 may be made bigger to enable it to have enough permeability to cater for the increased magnetic field. The challenge that may arise with this embodiment is that the cooling of the stator winding. The cooling in this embodiment may be effectively handled with water cooling into the stators 120, 130 210. The primary winding embedded in the stator and the secondary windings embedded in the stator 120, 130 210 may be located in the same stator 120, 130 210 and/or may be both superficially adhered or embedded with magnetite.

As mentioned above, in some embodiments, use of magnetite material may be appropriate, particularly for structural/body parts of the stators 120, 130, 210. The stator-stator airgaps 122, 212 may be small: in the size range of about 0 mm to about 10 mm, for example, 5 mm. As the stator-stator airgaps 122, 212 is small, the flow of air to cool the stators 120, 130, 210 may be reduced and therefore cooling may not be as effective.

Fine magnetite as material has favourable thermal properties. Magnetite material mixed with resin was found during a test work that magnetite releases heat into surrounding environment much faster than many electrical materials. Magnetite also gets hot slowly. Magnetite material for use in electrical applications has a number of favourable properties; one of the uses of the magnetite is where an electric power generator.

The return path 132 may be bigger with a bigger thickness. A size of the return path 132 in terms of its thickness may be one of the characterising features of this invention. Compared with the conventional design and state of the art, the return path 132 of this invention may always be thicker than the return path of the state of the art, even though the magnetic field gets less the more stators are added, the return path 132 may still be made thicker. When the return path 132 is made thicker, the electric power generator 100 is enabled to generate more power.

In basic prior art generators, that is, with a single central rotor and a single stator around the rotor, and without any waveform correction circuitry, voltage harmonics of the output waveform may be high. This present disclosure, the generator 100 gives an unexpected and somewhat surprising technical outcome of a smoother voltage waveform, and hence smoother torque on the rotor 110, a smoother airgap magnetic flux density between the rotor 110 and the inner stator 120, and also gives smoother magnetic airgap flux density between stators 120, 130. These smooth technical outcomes may be applicable for all the subsequent stators 210 of the generator 200.

An advantage of the generator 100 is that of low harmonic distortion. The generator may have under 1% THD (Total Harmonic Distortion) and may have about, or less than, 0.8% THD. In a particular embodiment in which the shortest distance 118 of the rotor-stator airgap 116, 188 is at least 35 mm and the longest distance 116 is 75 mm, and the stator-stator airgap is 10 mm and circumferentially uniform. In this embodiment, the generator 100 produced an output waveform with under 0.8% THD. A standard requirement for harmonics is under 8% for power generation, and this generator 100 was therefore well under this threshold without any additional waveform-correcting or -shaping circuitry.

This low THD gives an opportunity to configure that generator more aggressively to produce more current— usually a practice which increases THD but this may be done to approach the 8% limit and extract more power while keeping harmonics distortion under the acceptable THD threshold. In this embodiment, both the two stators generate a low voltage harmonic. The low voltage harmonics may provide a huge economic benefit in that the increase of the current will generate more power and increase the economic benefit and this will generate economic success. This low-harmonics benefit solves a high-level harmonic limitation of a conventional prior art generator.

Another point to note is that the outer stator 130 has a larger radius than the inner stator 120 and therefore has a larger area for providing teeth and windings in the teeth. This may assist in electricity generation. The more the size of the stator increases, the more the voltage generation increases due to the increase of the integral surface area. Therefore, the more stators are added, with bigger radius the more voltage is generated even if the turns per phase are same. This also generate better economic benefit and bring economic success.

The method of operation of this generator 100 may be that it can operate in different modes to suit different conditions of the customer or grid. Both stators 120, 130 may be operated on-load. Alternatively, the generator 100 may be operated where the inner start 120 is operated off-load and the outer stator 130 is running on-load, that is for in instances where there is less demand. The inner stator 120 may moderate the magnetic field where the power output still may have low voltage harmonics in the outer stator 130. The reason to choose the stator 120 to operate off-load is because, at higher voltage above 700 V, it generates the least amount of power compared to all other stators due to its radius size. The fact that one of the stators is off-load does not affect the quality of the electric power in terms of the voltage harmonics. In other words, even when operating one of the stators 120 off-load, the other stator 130 being operated on-load still has favourable or low THD characteristics. Accordingly, even though one of the stators 120 is off-load, its mere presence or proximity to the other stator 130 still provides a technical effect. In comparison with the conventional design of one rotor and one stator, even if the one stator is made as big as the combined three or two stators, the multiple stator design performs comparatively better due to the technical effect of the low voltage harmonics.

The result of running the inner stator 120 off-load may be that the opposing mechanical effect on the rotation of the rotor 110 and the cogging torque from the other stators 130 are diminished, and therefore the operation of the generator 100 is smoother and improved. Any other stator 130, 210 may be operated off-load adjusting for the power demand. The outer stator 130, 210 may not be the preferred one to operate off-load, also considering the power demand. This embodiment offers some operations flexibility of the electric power generator 100, 200. This characterising feature of low harmonics may solve the limitation created by relatively high level of harmonics in conventional art. The electric generator 100, 200 may operate flexibly, whereby at least one stator is operating on load while the other stator(s) are operating off load or at least one stator is operating off load while the other stator(s) are operating on load, and still generate low harmonics voltage. This mode of operation may improve the smooth operation of the generator 100, 200.

The generator 100, 200 may have a support structure (not illustrated). The support structure may comprise only a single back-iron 132 for all of the stators 120, 130, 210. All stators 120, 130, other than the outermost stator 130, 210 may be supported with tie-bars across to stiffen the stator 120, 130, 210 and hold it together against any movement. The tie-bar which may be used on these stators 120, 130, 210 may comprise 10.9 structural steel grade to be of the desired strength.

Another method to support the intermediate stators 120, 130 is to use a non-magnetic and non-conductive material as support structure in the form of tie-bars that will not affect the magnetic field flow direction on its path to the windings and will not produce undesired magnetic interference.

This proposed electric generator 100 has a rotor and adjacent multiple stators and is a simple solution to generate more power with a single rotor. A characterising feature of the electric generator 100 is the multiple stators. There may at least be two stators. This proposed invention opens a new way of how to generate more power with a single rotor and by so doing this invention substantially improves the art with a superiority in the property of low harmonics and gives a technical significance to this invention. The synergistic working together of the factors which are the bigger size outer stators, the integral of the surface area of the stators and the up to doubling of the magnetic field when the two stators face each other; these factors work together to increase the voltage output for this electric generator 100.

In some embodiments, the return path maybe up to ten times thicker than a prior art invention. For the same sized rotor, the optimised return path for this invention may be at least 1.5 times thicker than the optimised conventional design. This back-iron (sometimes referred to as the return path) may at least be 2 mm in thickness. When the return path is made thicker, the electric power generator is enabled to generate more power even when maintaining the same field current and the same stator current, but increases the thickness of the return path, the generator produces more power by generating more voltage. This is quite a surprising technical outcome and very advantageous, and therefore the thicker return path may be a distinguishing feature of the electric generator 100. For the electric generator 100, the return path is always located at the outermost stator of this invention. The return path may be thicker than the second or the outermost stator.

Another embodiment of this invention is that as the invention has multiple stators and one rotor, therefore an embodiment where there is one rotor with multiple stators and a dummy stator in the electric generator. Differently stated, the electric power generator may further include a dummy stator, in addition to the plurality of stators, and arranged concentrically with the plurality of stators, the dummy stator being characterised in that it has no operative windings.

Clauses

1. An electric power generator has multiple stators where the generator has a rotor as its innermost part of the generator with at least two concentric stators where the airgap between the rotor and the innermost stator is at least 10 mm in the midpoint of outer surface of the rotor poles and the airgap increases uniformly to at least 50 mm at the two ends of the poles and the air-gap between the adjacent stators is at least (zero) 0 mm all around the circumference of the two adjacent stators.
2. An electric Power Generator according to clause 1, where each of the intermediate stators has a thin layer of electric steel as back iron for stator support where the thickness of the back iron is at least 2 mm.
3. An electric power generator according to clause 1, where the teeth of the adjacent outer stator are joined to the back of the preceding (adjacent) stator for support of the intermediate stators that are between the rotor and the outermost stator
4. An electric power generator according to clause 1, where tie-rods of comprising 10.9 grade of structural steel are used for support of intermediate stators between the rotor and the outermost stator.
5. An electric power generator according to clause 1, where a non-magnetic and non-electrically conductive material is used as support structure of the intermediate stators located between the rotor and the outermost stator.
6. An electric power generator according to clause 1, where the airgap between stators is 5 mm all-round the circumference of the stators.
7. A method of an electric power generation according to clause 1, where the airgap between the inner stator (S1) and the outer stator (S2) is 5 mm and this airgap generates a smoother sine waveform with lower harmonics of less than 0.8%.
8. A method of electric power generation according to clause 1, where the windings of at least one stator is embedded in finely ground magnetite or magnetite mixed with resin where the magnetite increase the electric field.
9. A method of electric power generation in an electric power generator according to clause 1, where at least one stator has one of the following windings:
   there are secondary windings in the upper section of the stator which are isolated from the power generation windings of the stator where the secondary windings have no current input into them, but generate magnetic field by the rotor movement which is magnified by the steel and add on to the rotor magnetic field; or
   where the power generation windings are fully embedded in the electric steel stator structure to generate more magnetic field which are magnified by the steel structure and a water cooling is used to cool the stator.
10. An electric power generator according to clause 1, where the return path is pasted with magnetite to increase the magnetic field on the stator.
11. An electric power generator according to clause 1, where the thin layer of steel that is on the back of the stator of intermediate stators is pasted with magnetite.
12. A method of electric power generation in an electric power generator according to clause 1, where the stator closest to the rotor is operated off-load and the opposing mechanical effect on the rotation of the rotor and the cogging torque from the other stators are diminished.
13. A method of electric power generation in an electric power generator according to clause 1, where at least one of the intermediate stator between the rotor and the outermost stator is operated off-load and all the other stators are operated on load.

14. An electric power generator that has multiple stators where the generator has a rotor as its innermost part of the generator with at least two concentric stators that are radially located with the rotor where there is a rotor-stator airgap between the rotor and the innermost stator and there is a stator-stator airgap between the adjacent stators.

The invention claimed is:

1. An electric power generator comprising a rotor and a plurality of stators, wherein:
   the rotor and the plurality of stators are arranged coaxially and concentrically about a central axis;
   the rotor is provided radially inwardly of the plurality of stators;
   a first stator of the plurality of stators is provided concentrically around and adjacent to the rotor, the rotor and the first stator being separated by a rotor-stator airgap;
   a second stator of the plurality of stators is provided concentrically around and adjacent to the first stator, the first and second stators being separated by a stator-stator airgap;
   the rotor includes a plurality of magnetic pole structures configured to provide or generate a plurality of magnetic poles;
   a radially outer surface of each of the magnetic pole structures is curved with an average radius of curvature which is less than an average distance between the outer surface and the central axis, the rotor-stator airgap thus varying circumferentially in distance, with a shortest distance being at a circumferential centre of each of the magnetic pole structures and longest distance being at circumferential ends of each of the magnetic pole structures;
   wherein the stator-stator airgap is shorter than the shortest distance of the rotor-stator airgap;
   wherein the electric power generator includes a back-iron configured to provide a return path and assist in closing a magnetic circuit from the magnetic poles of the rotor, the back-iron is provided around the plurality of stators, in other words, around, the back-iron having a thickness of at least 2 mm; and
   wherein the stator-stator airgap is of uniform thickness and is at least 0.25 mm.

2. The electric power generator as claimed in claim 1, in which a ratio of the longest distance to the shortest distance is in the range of 30:1 to 2:1.

3. The electric power generator as claimed in claim 1, in which the shortest distance at a circumferential centre of each of the magnetic pole structures is 5-50 mm.

4. The electric power generator as claimed in claim 1, in which the longest distance at circumferential ends of each of the magnetic pole structures is 30-150 mm.

5. The electric power generator as claimed in claim 1, in which the longest distance is 135 mm and the shortest distance is at least 5 mm.

6. The electric power generator as claimed in claim 1, in which the plural stators work together to form a better output waveform having lower harmonics from windings in the plural stators compared that from an individual one of the plural stators.

7. The electric power generator as claimed in claim 1, which produces, as a result of presence and configuration of the plural stators, a sinusoidal output waveform having a Total Harmonic Distortion of less than 0.8% without use of waveform-correcting circuitry.

8. The electric power generator as claimed in claim 1, which comprises at least three stators, namely the first stator, the second stator, which is an intermediate stator, and a third stator, which is an outermost stator, provided concentrically around and adjacent to the second stator, the second and third stators being separated by a second stator-stator airgap.

9. The electric power generator according to claim 1, wherein teeth of the second stator are joined to a back of the first stator for support.

10. The electric power generator according to claim 1, which includes tie-rods comprising steel provided between adjacent stators for support thereof.

11. The electric power generator according to claim 1, which includes a non-magnetic and non-electrically conductive material is used as support structure between adjacent stators.

12. The electric power generator according to claim 1, which further includes a dummy stator, in addition to the plurality of stators, and arranged concentrically with the plurality of stators, the dummy stator being characterised in that it has no operative windings.

13. A method of operating the electric power generator as claimed in claim 1, in which:
   all of the plurality of stators are operated on-load; or
   all but one of the plurality of stators are operated on-load and one of the plurality of stators is operated off-load.

14. A method of operating the electric power generator as claimed in claim 12, in which the dummy stator is operated off-load.

* * * * *